(12) United States Patent
Jung

(10) Patent No.: US 12,631,230 B2
(45) Date of Patent: May 19, 2026

(54) ACTUATOR AND DRUM BRAKE INCLUDING THE SAME

(71) Applicant: HL MANDO CORPORATION, Pyeongtaek-si (KR)

(72) Inventor: Yoodon Jung, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 385 days.

(21) Appl. No.: 18/235,466

(22) Filed: Aug. 18, 2023

(65) Prior Publication Data

US 2024/0240682 A1 Jul. 18, 2024

(30) Foreign Application Priority Data

Jan. 18, 2023 (KR) ........................ 10-2023-0007636

(51) Int. Cl.
*F16D 65/22* (2006.01)
*F16D 121/24* (2012.01)
*F16D 125/40* (2012.01)
*F16D 125/52* (2012.01)

(52) U.S. Cl.
CPC .......... *F16D 65/22* (2013.01); *F16D 2121/24* (2013.01); *F16D 2125/40* (2013.01); *F16D 2125/52* (2013.01)

(58) Field of Classification Search
CPC ............. F16D 2121/24; F16D 2125/40; F16D 5251/20–22; F16D 65/22
See application file for complete search history.

(56) References Cited

U.S. PATENT DOCUMENTS

| 2021/0123490 A1* | 4/2021 | Jo | ............................ F16D 51/22 |
| 2021/0253074 A1* | 8/2021 | Jo | .......................... B60T 13/741 |
| 2023/0060796 A1* | 3/2023 | Son | .......................... F16D 65/22 |

FOREIGN PATENT DOCUMENTS

| KR | 10-2010-0043694 A | 4/2010 |
| KR | 10-1889455 B1 | 9/2018 |
| KR | 10-2172157 B1 | 10/2020 |

* cited by examiner

*Primary Examiner* — David R Morris
(74) *Attorney, Agent, or Firm* — Harvest IP Law, LLP

(57) ABSTRACT

An actuator used in a drum brake according to the present embodiment may include a case with a space therein, a shaft rotated by a motor and having a worm gear formed thereon, a wheel gear engaged with the worm gear, a spindle bolt passing through and coupled to the wheel gear and including a head and a column of which an outer circumferential surface is provided with a thread, a spindle nut fastened to the thread of the spindle bolt, a first piston of which one side is in contact with the spindle nut and the other side is in contact with the first brake shoe, a second piston of which one side is in contact with the head of the spindle bolt and the other side is in contact with the second brake shoe, and an O-ring disposed between the spindle nut and the wheel gear.

20 Claims, 6 Drawing Sheets

ACTUATOR AND DRUM BRAKE INCLUDING THE SAME

CROSS-REFERENCE TO RELATED APPLICATION

This application claims the benefit of Korean Patent Application No. 10-2023-0007636, filed on Jan. 18, 2023 in the Korean Intellectual Property Office, the disclosure of which is incorporated herein by reference.

BACKGROUND

1. Field

Embodiments of the present disclosure relate to an actuator and a drum brake including the same.

2. Description of the Related Art

In general, parking brakes are to keep vehicles at a standstill when the vehicles are parked on roads or the ground, and there are parking brakes as foot brake types and hand brake types. Generally, in the case of small vehicles, the hand brake types are used, and in the case of medium-to-large vehicles, the foot brake types are widely used.

In the conventional parking brake system, when a driver operates a parking lever inside a vehicle, a parking rod pulls an operating lever of rear drum brakes, and in this case, linings connected to the operating lever expand to press drums, and thus vehicle wheels are braked using frictional forces between the drums and the linings.

In the conventional parking brake system, when the parking rod is pulled by the parking lever, the operating lever in the drum brake, which is attached to each lining, is pulled by operating in conjunction with the parking rod. In this case, the lining expands around a lining support point and comes into contact with a friction surface of the drum, and thus parking is performed.

As described above, the conventional manual parking brake, which operates the parking lever to brake the wheels, is very inconvenient because the driver should manually operate the parking lever whenever operation of the brake during parking is performed and is also inconvenient due to an accident risk because the manual operation of the parking layer is often forgotten.

Therefore, recently, an electrical parking brake (EPB), which simply performs a parking operation using a driving force of a motor and also maintains a braking state, has been used in order to solve the inconvenience of the manual parking brake. In the general EPB, when a control button inside the vehicle is pressed to drive the motor, the parking rod is pulled according to the rotation of the motor, and thus an equal braking force is generated on each vehicle wheel.

SUMMARY

Therefore, it is an aspect of the present disclosure to provide an actuator having a structure capable of detecting jamming or failure of a nut spindle in advance.

It is another aspect of the present disclosure to provide a drum brake having a detector capable of detecting jamming or failure of a nut spindle in advance.

In accordance with one aspect of the present disclosure, an actuator used in a drum brake includes a case with a space therein, a shaft rotated by a motor and having a worm gear formed thereon, a wheel gear engaged with the worm gear, a spindle bolt passing through and coupled to the wheel gear and including a head and a column of which an outer circumferential surface is provided with a thread, a spindle nut fastened to the thread of the spindle bolt, a first piston of which one side is in contact with the spindle nut and the other side is in contact with the first brake shoe, a second piston of which one side is in contact with the head of the spindle bolt and the other side is in contact with the second brake shoe, and an O-ring disposed between the spindle nut and the wheel gear.

The actuator may further include a wave washer disposed adjacent to the O-ring.

A groove may be formed in an inner surface of the case at a position behind the O-ring.

The actuator may further include a retaining ring fitted into the groove.

The actuator may further include a bush spindle disposed between the retaining ring and the wheel gear.

The actuator may further include a first boot spindle of which one end is fitted into the case and the other end is fitted into the first piston.

The actuator may further include a second boot spindle of which one end is fitted into the case and the other end is fitted into the second piston.

The actuator may further include a plain bearing interposed between the case and the wheel gear.

The spindle nut may be configured to push the first piston so that the first piston pushes the first brake shoe.

The head of the spindle bolt may be configured to push the second piston using a reaction force to push the second brake shoe.

In accordance with another aspect of the present disclosure, a drum brake includes a motor, a case with a space therein, a wheel gear rotated in the case using a driving force provided by the motor, a spindle bolt including a head and a column of which an outer circumferential surface is fitted into the wheel gear and provided with a thread, a spindle nut fastened to the thread, a first piston disposed in front of the spindle nut so that an end portion of the column is inserted into the first piston, a second piston into which the head of the spindle bolt is fitted, an O-ring disposed between the spindle nut and the wheel gear, a first brake shoe which comes into contact with the first piston, a second brake shoe which comes into contact with the second piston, a detector configured to detect a current applied to the motor, and a controller configured to compare a normal current pattern corresponding to a pattern of a current applied to the motor in a normal state with a pattern of a current detected by the detector.

In a case in which the spindle nut is in contact with the O-ring in a release state, a section in which a current value increases may be detected by the detector.

In a case in which the spindle nut rotates in a fastening direction to move the first piston outward in an axial direction, the first piston may push the first brake shoe, and the second piston may push the second brake shoe.

The column may include a portion having the thread formed thereon and a cylindrical cross section and a portion having a hexagonal cross section, and the wheel gear may be fitted onto the portion having the hexagonal cross section.

A first groove into which an end portion of the first brake shoe is inserted may be formed in the first piston, and a second groove into which an end portion of the second brake shoe is inserted may be formed in the second piston.

The drum brake may further include a first spring of which one end portion is connected to an upper side of the first brake shoe and the other end portion is connected to an upper side of the second brake shoe.

The drum brake may further include a second spring of which one end portion is connected to a lower side of the first brake shoe and the other end portion is connected to a lower side of the second brake shoe.

A groove having a ring shape may be formed in an inner wall of the case at a position adjacent to the wheel gear.

The controller may be configured to determine whether to operate a safety mechanism of the motor in a case in which it is determined that a pattern of a current detected by the detector is an abnormal pattern.

The controller may be configured to determine whether to stop rotation of the motor in a case in which it is determined that a pattern of a current detected by the detector is generated according to a result of contact between the spindle nut and the O-ring.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
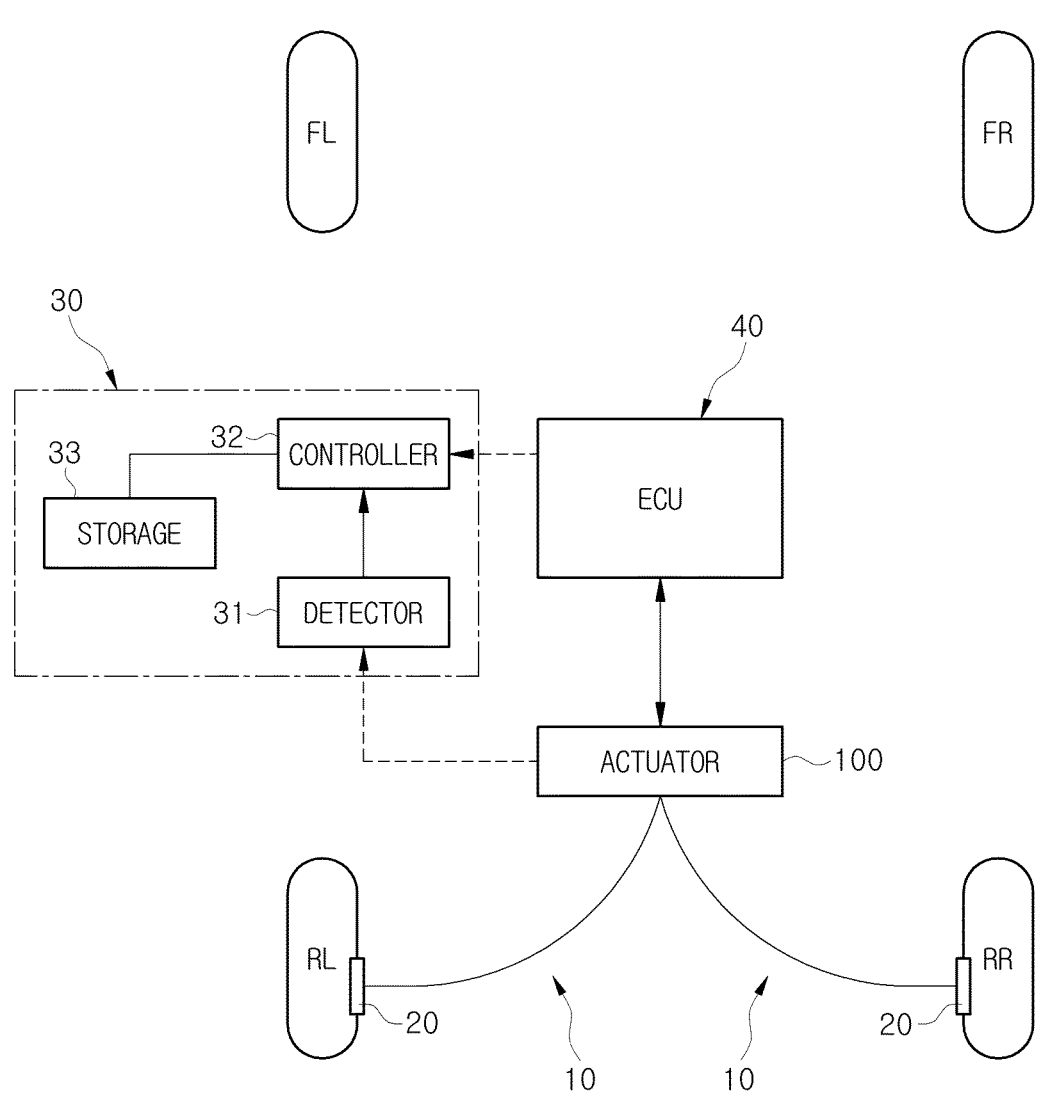
FIG. 1 is a control block diagram for describing an operation of a drum brake according to one embodiment of the present disclosure.

Hereinafter, embodiments of the present disclosure will be described in detail with reference to the accompanying drawings. The embodiments, which will be described below, are examples which provide the concept of the present disclosure to those skilled in the art. The present disclosure is not limited to the embodiments, and may be implemented in different forms. Parts irrelevant to description are omitted in the drawings in order to clearly describe the present disclosure, and widths, lengths, and thicknesses of components in the drawings may be exaggerated for convenience of description. In this specification, like reference characters denote like components.

Figure 2:
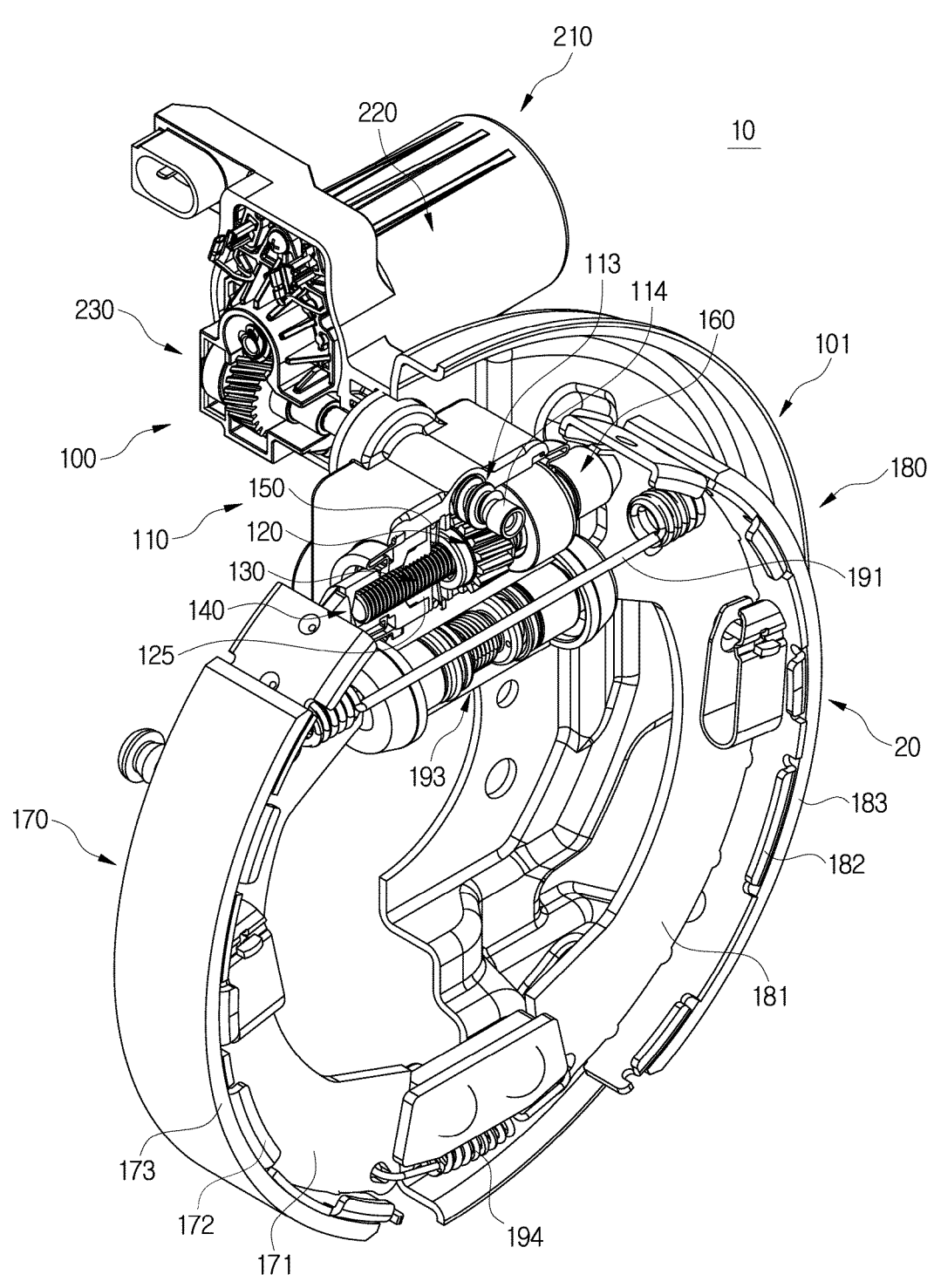
FIG. 2 is a perspective view illustrating the drum brake according to one embodiment of the present disclosure.
Figure 3:
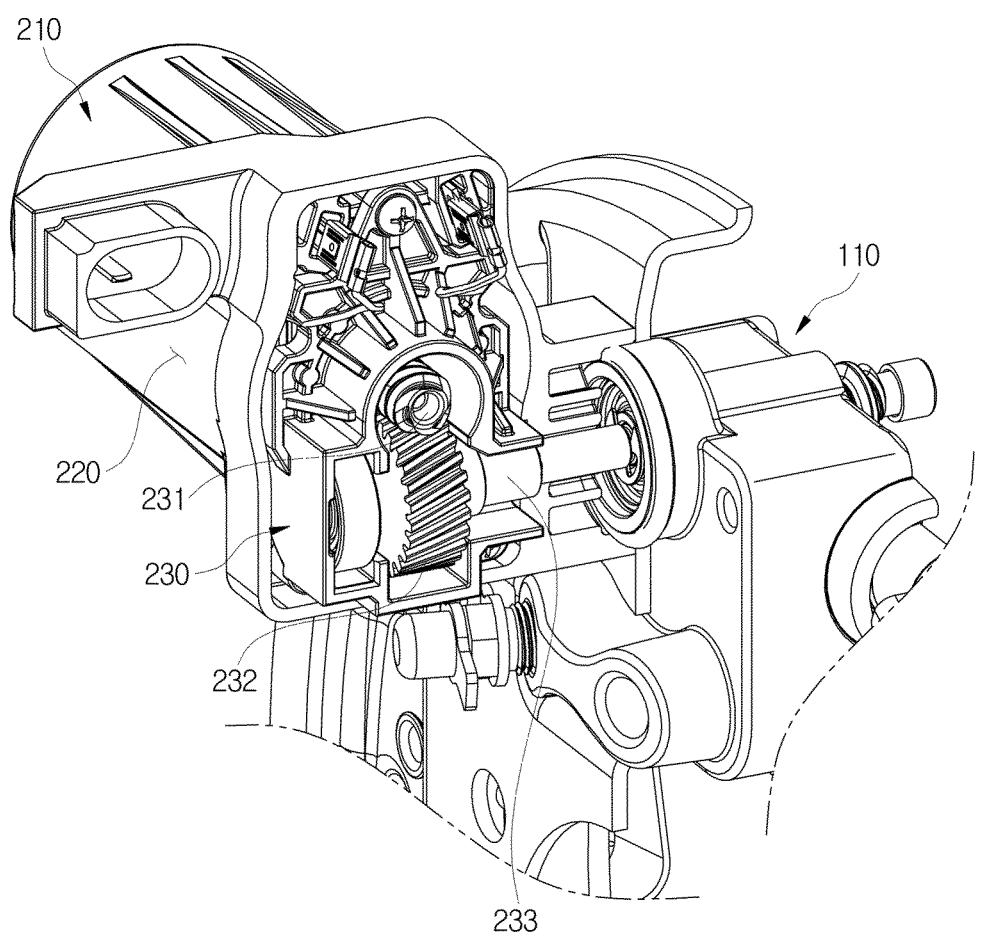
FIG. 3 is a rear perspective view illustrating the drum brake illustrated in FIG. 2.

FIG. 1 is a control block diagram for describing an operation of a drum brake 10 according to one embodiment of the present disclosure, FIG. 2 is a perspective view illustrating the drum brake 10 according to one embodiment of the present disclosure, and FIG. 3 is a rear perspective view illustrating the drum brake 10 illustrated in FIG. 2.

Referring to FIG. 1, the drum brake 10 may include an actuator 100 and a brake device 20. An electronic controller (ECU) 40 may control the actuator 100 based on a signal transmitted from a detection device 30. The actuator 100 may be connected to the detection device 30, and the detection device 30 may detect a current applied to the actuator 100. The detection device 30 may include a detector 31 which detects the current applied to the actuator 100, a storage 33 which stores a current pattern, and a controller 32 which determines whether a failure occurs based on a pattern of a current detected by the detector 31. The controller 32 may compare a normal current pattern, which is a pattern of a current applied to the motor in a normal state, with a pattern of a current detected by the detector.

The detector 31 may detect a current applied to at least one actuator included in an electrical parking brake. To this end, the detector 31 may include at least one of a current sensor or a current transformer (CT) sensor. When the actuator included in the drum brake is provided as a plurality of actuators, the detector 31 may be provided in each actuator to detect a current applied to each actuator.

The storage 33 stores a program and data necessary for an operation of the electrical parking detection device 30. For example, the storage 33 may store the normal current pattern according to each operation of the drum brake and a fault current pattern according to a failure type in each operation. In this case, the normal current pattern is a pattern of a current applied to the actuator when the electrical parking brake operates normally, and the fault current pattern is a pattern of a current applied to the actuator when the electrical parking brake operates abnormally (that is, in a failure state). For example, the fault current pattern may include a deadlock current pattern which is a pattern of a current applied to the actuator when a brake is stuck, a burst current pattern which is a pattern of a current applied to the actuator when the brake bursts, and the like.

The controller 32 determines whether the drum brake has failed. More specifically, the controller 32 may determine whether the electrical parking brake has failed by comparing the normal current pattern of the electrical parking brake with a pattern of a current detected by the detector 31. In addition, when the electrical parking brake has failed, a failure type of the electrical parking brake may be determined by comparing a fault current pattern according to a failure type with a pattern of a detected current.

Referring to FIGS. 2 and 3, the drum brake 10 may include a motor part, the actuator 100, and the brake device 20.

The motor part may include a motor case 210, a motor 220 accommodated in the motor case 210, and a power transmitter 230 which transmits a driving force of the motor 220. The power transmitter 230 may include an input gear 231 provided in a worm gear type, a transmission gear 232 provided in a worm gear type and engaged with the input gear 231, and a driving shaft 233 fitted into the transmission gear 232. The driving shaft 233 may extend into the case 110.

The actuator 100 includes a case 110 with a space therein, a wheel gear 120, which is rotated by a driving force provided by the motor 220, in the case 110, a spindle bolt 130 on which a thread is formed and of which a circumferential surface is fitted into the wheel gear 120, a spindle nut 125 fastened to the thread, a first piston 140 disposed in front of the spindle nut 125, and a second piston 160 disposed behind the spindle nut 125. The actuator 100 may include an O-ring 150 disposed between the spindle nut 125 and the wheel gear 120.

The wheel gear 120 may be engaged with a worm gear 113 formed on the driving shaft 233. A bushing 114 may be provided on an end portion of the driving shaft 233.

The brake device 20 may include a back plate 101, a first brake shoe 170 which comes into contact with the first piston 140, and a second brake shoe 180 which comes into contact with the second piston 160. The first brake shoe 170 may include a first web 171, a first rim 172, and a first lining 173.

The second brake shoe 180 may include a second web 181, a second rim 182, and a second lining 183.

A spring for generating a reaction force may be provided between the first brake shoe 170 and the second brake shoe 180. One end portion of a first spring 193 may be connected to an upper side of the first web 171, and the other end portion thereof may be connected to an upper side of the second web 181. One end portion of a second spring 194 may be connected to a lower side of the first web 171, and the other end portion thereof may be connected to a lower side of the second web 181.

When the spindle nut 125 rotates in a fastening direction to move the first piston 140 outward in an axial direction, the first piston 140 may push the first brake shoe 170, and a head 132 of the spindle bolt 130 may push the second piston 160 using a reaction force so that the second piston 160 pushes the second brake shoe 180. Conversely, when the spindle nut 125 rotates in a release direction to move the first piston 140 inward in the axial direction, since the first piston 140 does not push the first brake shoe 170, the first brake shoe 170 may return to an original position of the first brake shoe 170, and since the second piston 160 does not push the second brake shoe 180, the second brake shoe 180 may return to an original position of the second brake shoe 180.

The drum brake 1 may have a structure in which, when a worm wheel, that is, the wheel gear 120, is rotated by the actuator 100, the spindle bolt 130 rotates together with the spindle nut 125 so that the spindle nut 125 pushes the first piston 140 and thus the first brake shoe 170 expands and comes into contact with a drum (not shown), and then the spindle bolt 130 pushes the second piston 160 using a reaction force and thus the second brake shoe 180 at the opposite side expands to perform parking.

In this case, since control is performed using a current, there is a possibility of some malfunctions during release, or jamming of or damage to the spindle nut and the wheel gear during fully release for lining replacement.

As in the embodiment, the O-ring 150 may be used to generate an abnormal current waveform in advance to diagnose an abnormal operation in advance so as to prevent jamming of and damage to the spindle nut and the wheel gear in advance during release.

Figure 4:
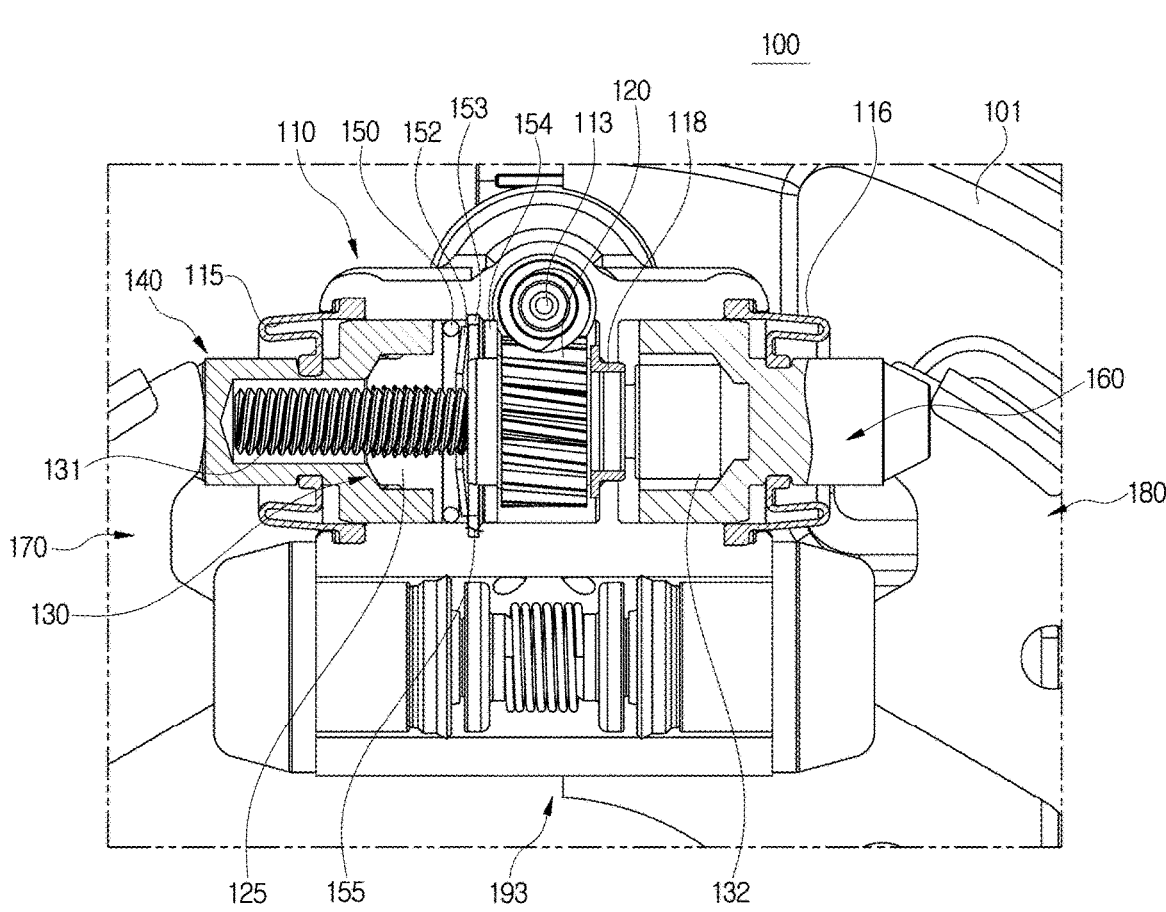
FIG. 4 is a partial cross-sectional view illustrating an actuator of the drum brake illustrated in FIG. 2.
Figure 5:
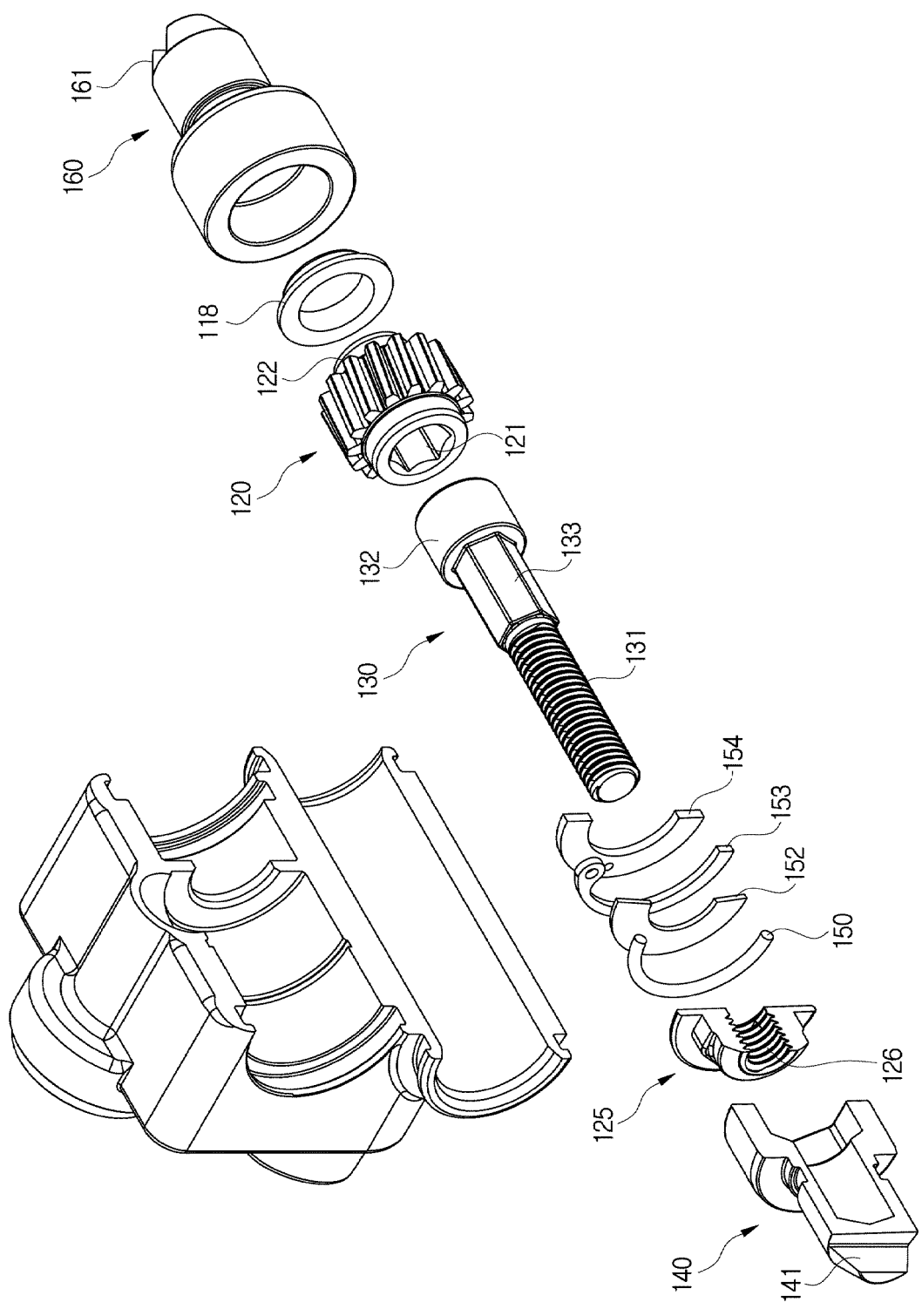
FIG. 5 is an exploded perspective view illustrating the actuator illustrated in FIG. 4.

FIG. 4 is a partial cross-sectional view illustrating the actuator 100 of the drum brake illustrated in FIG. 2, and FIG. 5 is an exploded perspective view illustrating the actuator 100 illustrated in FIG. 4.

Referring to FIG. 4, in the actuator 100, the wheel gear 120 may be engaged with and rotated by the worm gear 113 which is rotated by a driving force provided by the motor 220. The rotation of the wheel gear 120 may move the spindle nut 125 outward in the axial direction.

The actuator 100 may further include a first boot spindle 115, of which one end is fitted into the case 110 and the other end is fitted into the first piston 140, and a second boot spindle 116 of which one end is fitted into the case 110 and the other end is fitted into the second piston 160.

The spindle bolt 130 may pass through and be coupled to the wheel gear 120. The spindle bolt 130 may include a column 131 of which an outer circumferential surface is provided with a thread, and the head 132. The spindle nut 125 may be fastened to the thread formed on the column 131.

The column 131 may include a portion having a cylindrical cross section and the thread formed thereon and a portion 133 having a hexagonal cross section. A through portion 121 having a hexagonal column shape may be formed at a center of the wheel gear 120, and the through portion 121 of the wheel gear 120 may be fitted into the portion 133 having the hexagonal cross section. Accordingly, when the spindle bolt 130 rotates, a phenomenon of idle rotation with respect to the wheel gear 120 can be prevented.

One side of the first piston 140 into which an end portion of the column 131 is inserted may be in contact with the spindle nut 125, and the other side thereof may be in contact with the first brake shoe 170. One side of the second piston 160 into which the head 132 of the spindle bolt 130 is fitted may be in contact with the head 132 of the spindle bolt 130, and the other side thereof may be in contact with the second brake shoe 180.

A first groove 141 into which an end portion of the first web 171 of the first brake shoe 170 is inserted may be formed in the first piston 140, and a second groove 161 into which an end portion of the second web 181 of the second brake shoe 180 is inserted may be formed in the second piston 160.

Referring to FIG. 5, the O-ring 150 may be disposed between the spindle nut 125 and the wheel gear 120. A groove 155 having a ring shape may be formed in an inner wall of the case 110 at a position adjacent to the wheel gear 120, that is, in an inner surface of the case 110 at a position behind the O-ring 150.

A wave washer 152 may be disposed adjacent to the O-ring 150 at a position just behind the O-ring 150. A retaining ring 153 may be disposed to be fitted into the groove 155. By the retaining ring 153, the O-ring 150 may be prevented from being fitted into the groove 155. A bush spindle 154 may be disposed between the retaining ring 153 and the wheel gear 120.

A plain bearing 118 may be interposed between the case 110 and the wheel gear 120. The plain bearing 118 may support the wheel gear 120 to smoothly rotate in the case 110.

Figure 6:
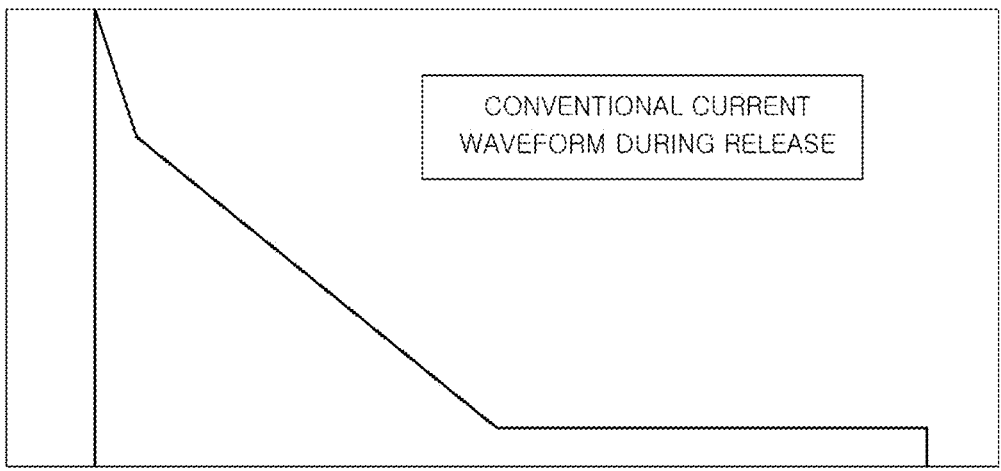
FIGS. 6 and 7 are a set of views illustrating current waveforms detected according to the control block diagram illustrated in FIG. 1.
Figure 7:
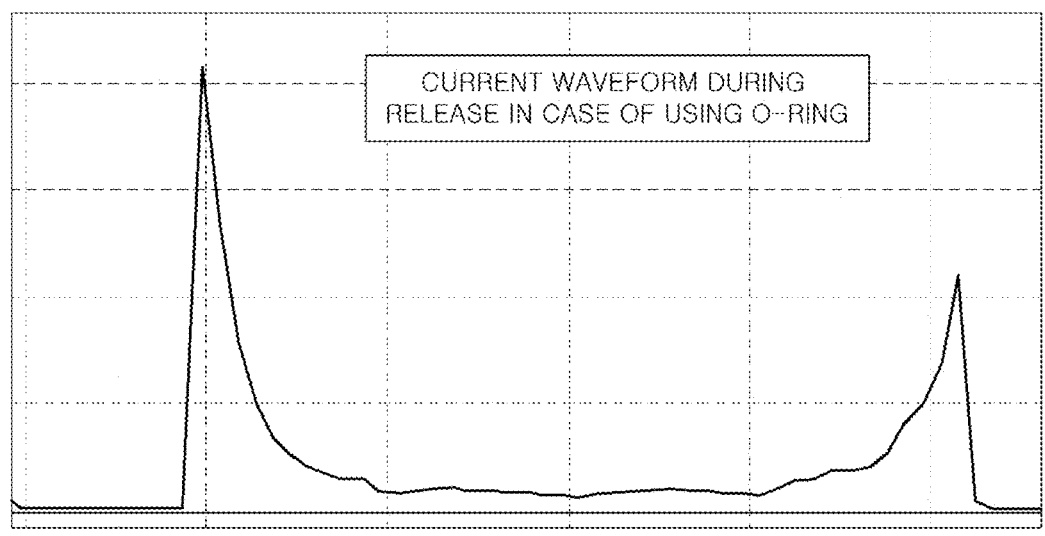

FIGS. 6 and 7 is a set of views illustrating current waveforms detected according to the control block diagram illustrated in FIG. 1.

FIG. 6 is a view illustrating a current waveform measured by a detector during release in an embodiment without an O-ring 150, and FIG. 7 is a view illustrating a current waveform measured by the detector during release in one embodiment with the O-ring 150. Referring to FIG. 7, when the spindle nut 125 comes into contact with the O-ring 150 in a release state, a section in which a current value increases may be detected by the detector 31.

The controller 32 may be configured to determine whether to operate a safety mechanism of the motor 220 when it is determined that a pattern of a current detected by the detector 31 is an abnormal pattern. When the controller 32 determines that the safety mechanism is necessary, the ECU 40 may operate a safe mode of the actuator 100.

In the safe mode, for example, the motor 220 rotates in the fastening direction, or the rotation of the motor 220 stops. That is, the controller 32 may be configured to determine whether to stop the rotation of the motor when it is determined that a pattern of a current detected by the detector 31 is generated according to a result of contact between the spindle nut 125 and the O-ring 150. In this case, the ECU 40 may stop an operation of the motor 220.

According to the conventional method, a safety mechanism is implemented only in the case of an extreme state, in which an operation is not stopped due to jamming or damage due to an abnormal operation, using a current waveform. In contrast, according to the embodiment, an abnormal current waveform can be generated to protect hardware of the actuator before an extreme situation such as jamming or damage occurs.

In an actuator according to an embodiment of the present disclosure, since an O-ring is disposed between a wheel gear and a spindle nut, the jamming or failure of the spindle nut can be prevented in a release state.

In a drum brake according to an embodiment of the present disclosure, a detector can detect a current waveform during release to activate a safety mechanism before a spindle nut is jammed or failed.

While the present invention has been described with reference to embodiments illustrated in the accompanying drawings, this is merely exemplary. It will be understood by those skilled in the art which various modifications and other equivalent example embodiments may be made from the embodiments of the present invention. Therefore, the scope of the present invention is defined by the appended claims.

What is claimed is:

1. An actuator used in a drum brake, comprising:
a case with a space therein;
a shaft rotated by a motor and having a worm gear formed thereon;
a wheel gear engaged with the worm gear;
a spindle bolt passing through and coupled to the wheel gear and including a head and a column of which an outer circumferential surface is provided with a thread;
a spindle nut fastened to the thread of the spindle bolt;
a first piston of which one side is in contact with the spindle nut and the other side is in contact with the first brake shoe;
a second piston of which one side is in contact with the head of the spindle bolt and the other side is in contact with the second brake shoe; and
an O-ring disposed between the spindle nut and the wheel gear.

2. The actuator of claim 1, further comprising a wave washer disposed adjacent to the O-ring.

3. The actuator of claim 1, wherein a groove is formed in an inner surface of the case at a position behind the O-ring.

4. The actuator of claim 3, further comprising a retaining ring fitted into the groove.

5. The actuator of claim 4, further comprising a bush spindle disposed between the retaining ring and the wheel gear.

6. The actuator of claim 1, further comprising a first boot spindle of which one end is fitted into the case and the other end is fitted into the first piston.

7. The actuator of claim 6, further comprising a second boot spindle of which one end is fitted into the case and the other end is fitted into the second piston.

8. The actuator of claim 6, further comprising a plain bearing interposed between the case and the wheel gear.

9. The actuator of claim 1, wherein the spindle nut is configured to push the first piston so that the first piston pushes the first brake shoe.

10. The actuator of claim 9, wherein the head of the spindle bolt is configured to push the second piston using a reaction force to push the second brake shoe.

11. A drum brake comprising:
a motor;
a case with a space therein;
a wheel gear rotated in the case using a driving force provided by the motor;

a spindle bolt including a head and a column of which an outer circumferential surface is fitted into the wheel gear and provided with a thread;
a spindle nut fastened to the thread;
a first piston disposed in front of the spindle nut so that an end portion of the column is inserted into the first piston;
a second piston into which the head of the spindle bolt is fitted;
an O-ring disposed between the spindle nut and the wheel gear;
a first brake shoe which comes into contact with the first piston;
a second brake shoe which comes into contact with the second piston;
a detector configured to detect a current applied to the motor; and
a controller configured to compare a normal current pattern corresponding to a pattern of a current applied to the motor in a normal state with a pattern of a current detected by the detector.

12. The drum brake of claim 11, wherein, in a case in which the spindle nut is in contact with the O-ring in a release state, a section in which a current value increases is detected by the detector.

13. The drum brake of claim 11, wherein, in a case in which the spindle nut rotates in a fastening direction to move the first piston outward in an axial direction:
the first piston pushes the first brake shoe; and
the second piston pushes the second brake shoe.

14. The drum brake of claim 13, wherein:
the column includes a portion having the thread formed thereon and a cylindrical cross section and a portion having a hexagonal cross section; and
the wheel gear is fitted onto the portion having the hexagonal cross section.

15. The drum brake of claim 11, wherein:
a first groove into which an end portion of the first brake shoe is inserted is formed in the first piston; and
a second groove into which an end portion of the second brake shoe is inserted is formed in the second piston.

16. The drum brake of claim 11, further comprising a first spring of which one end portion is connected to an upper side of the first brake shoe and the other end portion is connected to an upper side of the second brake shoe.

17. The drum brake of claim 16, further comprising a second spring of which one end portion is connected to a lower side of the first brake shoe and the other end portion is connected to a lower side of the second brake shoe.

18. The drum brake of claim 11, wherein a groove having a ring shape is formed in an inner wall of the case at a position adjacent to the wheel gear.

19. The drum brake of claim 11, wherein the controller is configured to determine whether to operate a safety mechanism of the motor in a case in which it is determined that a pattern of a current detected by the detector is an abnormal pattern.

20. The drum brake of claim 11, wherein the controller is configured to determine whether to stop rotation of the motor in a case in which it is determined that a pattern of a current detected by the detector is generated according to a result of contact between the spindle nut and the O-ring.

* * * * *